United States Patent
Cichy

[11] 3,726,621
[45] Apr. 10, 1973

[54] APPARATUS FOR PRODUCING OXIDE REFRACTORY MATERIAL HAVING FINE CRYSTAL STRUCTURE

[75] Inventor: Paul Cichy, Buffalo, N.Y.

[73] Assignee: The Carborundum Company, Niagara Falls, N.Y.

[22] Filed: June 15, 1971

[21] Appl. No.: 153,317

[52] U.S. Cl. ..............................425/6, 264/5, 264/8, 65/99
[51] Int. Cl..........................B22d 23/08, B28b 1/54
[58] Field of Search ..........................425/6; 264/5, 8; 65/99

[56] References Cited

UNITED STATES PATENTS

| | | | |
|---|---|---|---|
| 2,069,731 | 2/1937 | Trumpler | 264/5 |
| 2,411,152 | 11/1946 | Folsom | 264/5 X |
| 2,939,172 | 6/1960 | Von Reppert | 264/8 |
| 3,206,799 | 9/1965 | Davies et al. | 425/6 |
| 3,377,660 | 4/1968 | Marshall et al. | 65/99 X |

*Primary Examiner*—Robert L. Spicer, Jr.
*Attorney*—David E. Dougherty et al.

[57] ABSTRACT

Oxide refractory materials (for example, alumina-zirconia mixtures) can be cast to have an extremely fine crystal structure, by casting a melt of oxide refractory materials onto a non-reactive, non-melting particulate solid cooling media of a material other than that of the oxide refractory material (for example, steel spheres having a size ranging from about 5 to about 60 millimeters). The casting takes place within a solidification chamber having an opening in its lower end, through which the cooling media and solidified oxide refractory melt can be removed. According to one embodiment, the opening in the lower end of the solidification chamber is either temporarily completely blocked by a base, which is periodically removed to allow the recovery of cooling media and solidified oxide refractory melt, or continuously partially blocked by the base, so that the cooling media and solidified oxide refractory melt can be continuously recovered from the solidification chamber. According to another embodiment, no base at all is required, but the continuous discharge of cooling media and solidified oxide refractory melt is controlled by the angle of inclination of the cylinder which constitutes the solidification chamber. The solidified material, when crushed and graded, has exceptional utility as an extremely tough abrasive grain.

11 Claims, 4 Drawing Figures

INVENTOR.
PAUL CICHY

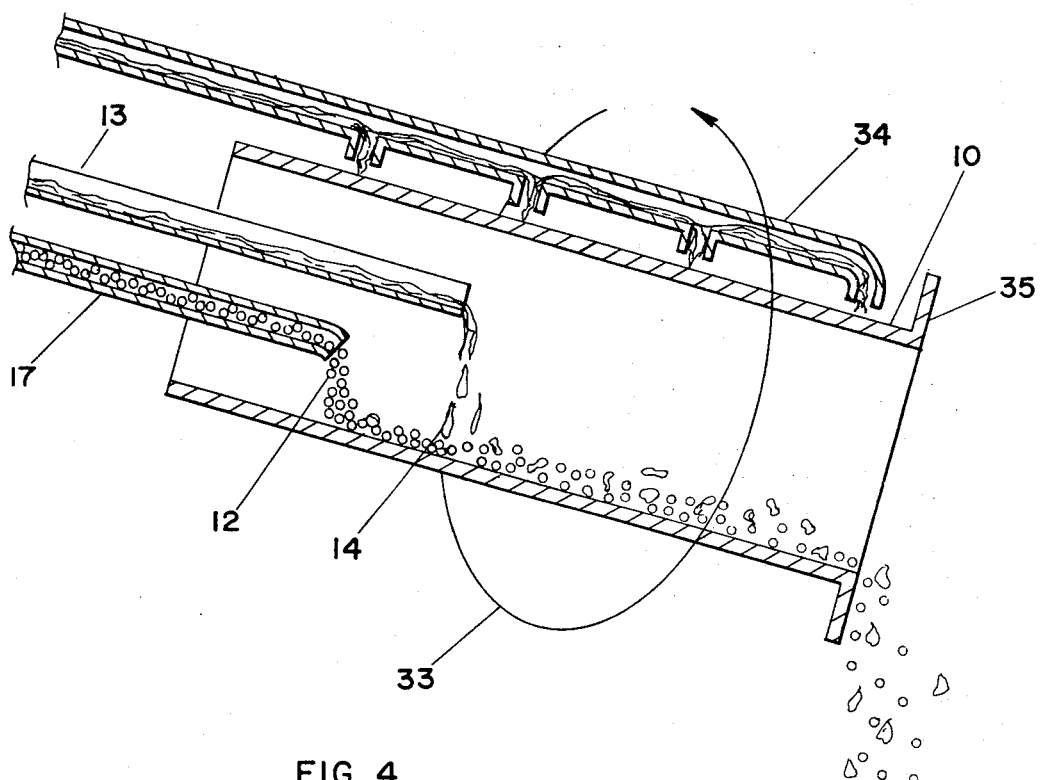
FIG. 4
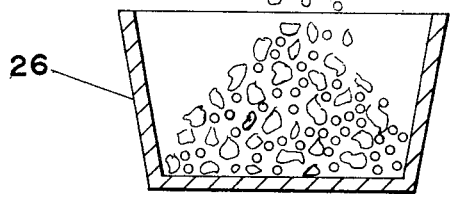

3,726,621

APPARATUS FOR PRODUCING OXIDE REFRACTORY MATERIAL HAVING FINE CRYSTAL STRUCTURE

CROSS REFERENCES TO RELATED APPLICATIONS

Copending, concurrently filed commonly assigned U.S. Pat. application, Ser. No. 153,302 filed June 15, 1971 by W. Q. Richmond discloses and claims the generic apparatus and process of which the present invention is an improvement, and also a composition having a fine crystal structure made possible by that apparatus and process. Copending, concurrently filed commonly assigned U.S. Pat. application Ser. No. 153,318 filed June 15, 1971 by W. Q. Richmond and P. Cichy discloses and claims certain improvements in the process and apparatus of the above-identified application filed by W. Q. Richmond.

BACKGROUND OF THE INVENTION

This invention relates to a process and apparatus for producing oxide refractory material having a fine crystal structure. Oxide refractory materials having a fine crystal structure are useful as refractory grain, or more particularly, as abrasive grain for inclusion in bonded abrasives such as grinding wheels and the like. For such purposes, it is highly desirable for the abrasive grain to have as fine a crystal structure as possible, since this gives toughness to the abrasive grain. Copending, concurrently filed commonly assigned U.S. Pat. application Ser. No. 153,302 filed June 15, 1971 by W. Q. Richmond discloses and claims a process and apparatus for making oxide refractory materials, characterized by an extremely fine crystal structure (for example, at least 90 percent by numerical count of the discontinuous crystals in a two-phase system having a particle size smaller than about 40 microns). Copending, concurrently filed, commonly assigned U.S. Pat. application Ser. No. 153,318 filed June 15, 1971 by W. Q. Richmond and P. Cichy discloses and claims apparatus and process for the semicontinuous production of oxide refractory material according to the W. Q. Richmond invention, the W. Q. Richmond and P. Cichy invention providing, in addition to the elements of the W. Q. Richmond invention, means for adding additional cooling media to the solidification chamber while the oxide refractory melt is cast into the solidification chamber. The invention of W. Q. Richmond and P. Cichy, however, is at best semicontinuous, since the solidification chamber, even if constructed to have very large dimensions, must still have some limit in size. Thus, when the solidification chamber becomes filled, the addition of cooling media and oxide refractory melt must be discontinued. Furthermore, the solidification chamber of the above-identified invention of W. Q. Richmond and P. Cichy, when filled, must somehow be emptied. While it is possible to recover the cooling media with a magnet (if magnetic cooling media are utilized), the solidified oxide refractory melt must, if the solidification chamber has a closed bottom, be poured from the solidification chamber. Since the solidification chamber when filled with cooling media and solidified oxide refractory melt can be quite heavy, this poses problems. While these problems are not insurmountable, it is an object of the present invention to provide for the semicontinuous operation of the above-identified invention of W. Q. Richmond and P. Cichy, without the attendant problem of building up large amounts of material within the chamber which must then be turned to remove the contents of the chamber. It is an additional object of the present invention to provide apparatus and process for continuously cooling and solidifying an oxide refractory melt. Other objects will be apparent from the specification.

SUMMARY OF THE INVENTION

According to the present invention, an oxide refractory melt is rapidly cooled and solidified to produce a solidified melt having a fine crystal structure. The solidification chamber is first provided with an initial supply, at least 15 cm in depth, of non-reactive, non-melting particulate solid cooling media of a material other than that of the oxide refractory melt to be rapidly cooled and solidified. The preferred cooling media are steel spheres, ranging from about 5 to about 60 mm in diameter. The present invention is characterized in that the lower end of the solidification chamber comprises an opening through which the cooling media and solidified oxide refractory melt can be removed from the solidification chamber. The oxide refractory melt is cast into the solidification chamber, over the cooling media, and additional cooling media are added to the solidification chamber while the oxide refractory melt is cast into the solidification chamber.

According to one embodiment of the invention (see FIGS. 2-3), there is provided a substantially horizontal, detachable, preferably substantially conical, base which either temporarily completely (see FIG. 1), or continuously partially (see FIGS. 2 and 3), blocks the opening in the lower end of the outer wall of the solidification chamber. By utilizing the base to open and close the lower end of the solidification chamber, the cooling media and solidified oxide refractory melt can be either periodically or continuously removed from the solidification chamber.

According to another embodiment of the invention (see FIG. 4), the apparatus solidification chamber consists essentially of a hollow cylindrical outer wall having a lower open end, this hollow cylindrical wall being inclined at an angle, whereby to control the continuous discharge of cooling media and solidified oxide refractory melt from the lower open end of the solidification chamber.

BRIEF DESCRIPTION OF THE DRAWINGS

FIG. 4 is a side view, partially in section, of another embodiment of the invention, wherein no base is required to cover the open end of the solidification chamber, since the continuous discharge of cooling media and solidified oxide refractory melt is controlled by means of adjustment of the angle of inclination of the cylinder which constitutes the solidification chamber.

DETAILED DESCRIPTION

Figure 1:
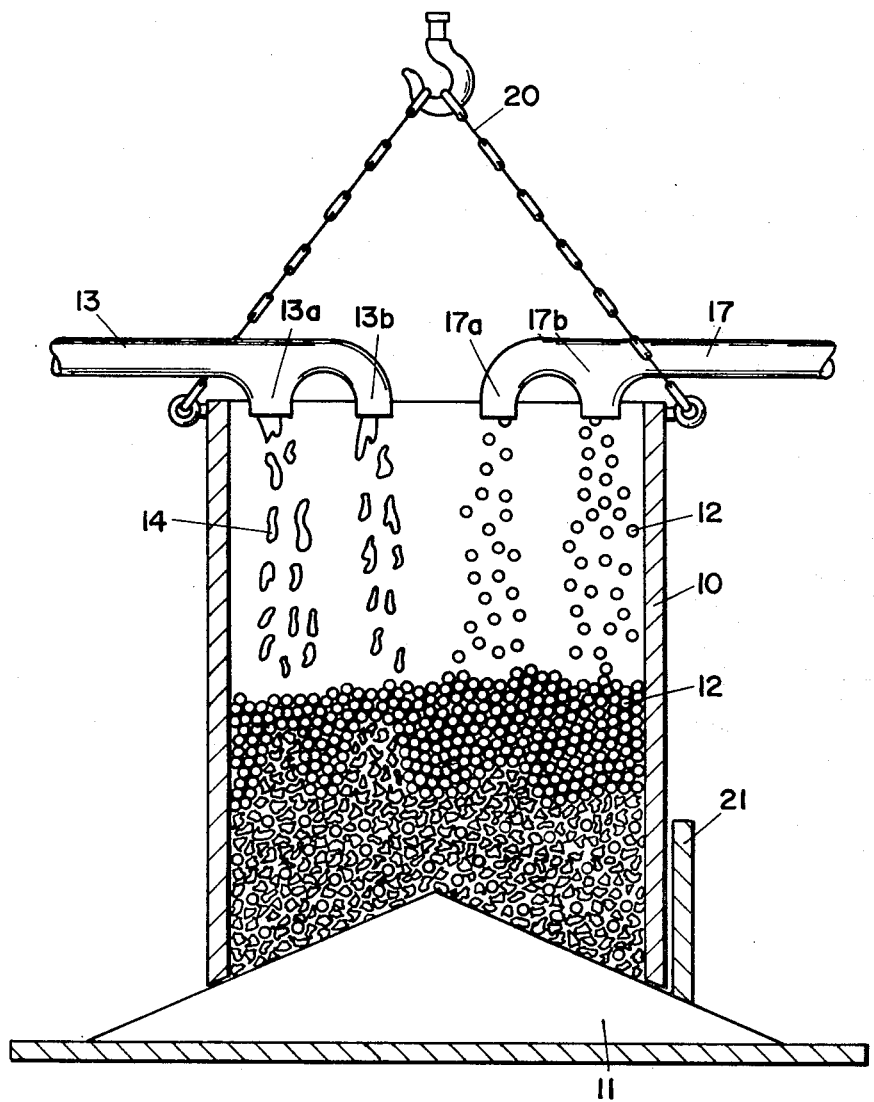
FIG. 1 is a side view, partially in section, of an embodiment of the invention adapted for batch or semicontinuous operation, wherein a conical base is periodically removed relative to the rest of the solidification chamber, so that the cooling media and solidified oxide refractory melt are allowed to run down the outer edges of the substantially conical base.

Referring again to the drawing, FIG. 1 illustrates an embodiment of the invention adapted for batch or semicontinuous operation. The solidification chamber for this embodiment comprises a substantially vertical hollow cylindrical outer wall 10, and a substantially horizontal, detachable, preferably substantially conical, base 11, capable of closing the opening in the lower end of the vertical hollow cylindrical outer wall 10. A "substantially horizontal" conical base, as used herein, has a vertical axis and a relatively blunt angle, but not so blunt that the cooling media and solidified melt will not run off the base of the cone. The solidification chamber 10, 11 is provided with means 13 for casting oxide refractory melt 14 into the solidification chamber 10, 11 over the cooling media 12, and also with means 17 for adding additional cooling media 12 to solidification chamber 10, 11 while the oxide refractory melt 14 is cast into the solidification chamber 10, 11. The upper end of solidification chamber 10, 11 is thus adapted for the addition of cooling media 12 and oxide refractory melt 14. The substantially vertical hollow cylindrical outer wall 10 is provided with an opening in its lower end through which cooling media and solidified oxide refractory melt can be removed. Means 13 for casting oxide refractory melt can be provided with a plurality of inlets 13a and 13b into solidification chamber 10, 11. Means 17 for adding additional cooling media 12 can be provided with a plurality of inlets 17a and 17b into solidification chamber 10, 11.

The criteria for the cooling media are several. First of all, the cooling media should be non-reactive with the oxide refractory material which is to be cast upon the cooling media. Secondly, the cooling media should be a non-melting particulate solid material other than the material of the oxide refractory material which is to be cast upon the cooling media. Whether the cooling media is non-melting with respect to a particular oxide refractory material which is to be cooled and solidified upon the cooling media can be determined by reference to the thermodynamic properties of the refractory material and the cooling media, as more fully described in the above-identified application of W. Q. Richmond.

Preferred, but not essential, properties of the cooling media include the following: The refractory media should have a relatively uniform size, so that the spaces between the cooling media (and therefore the size of the oxide refractory material as solidified) are about the same size; and the cooling media should preferably pack within the solidification chamber with a relatively predictable structure. The cooling media should preferably have a smooth surface so that the solidified melt does not stick to the surface of the cooling media after solidification. In order to facilitate separation of the cooling media from the solidified oxide refractory material, it is preferred that the cooling media be magnetic, so that the cooling media can be merely removed with a magnet after solidification of the oxide refractory material. In order to be capable of repeated use, the cooling media should be tough and heat shock resistant. Accordingly, the preferred cooling media for use in the present invention comprises metallic spheres of approximately uniform size (e.g., within about 20 percent). In particular, it is preferred that carbon steel be used as the cooling media. The size of the spheres affects the rate of cooling and consequently the crystal size and friability of the solidified oxide refractory material. Accordingly, it is preferred that the steel spheres range in size from about 5 to about 60 mm. Smaller spheres cool the melt more rapidly, but steel spheres which are smaller than about 5 mm are more difficult to remove from the solidified oxide refractory material. Within this range it is preferred to utilize steel spheres having a diameter ranging from about 12 to about 40 mm; and those ranging in size from about 18 to about 32 millimeters are even more preferred. Other cooling media which can be used include lumps of graphite or ferrosilicon.

In operation, the solidification chamber 10, 11 is filled simultaneously with additional cooling media 12 and refractory oxide melt 14, which melt 14 becomes rapidly solidified shortly after coming into contact with cooling media 12. The solidification chamber 10, 11 eventually becomes filled, such that the addition of cooling media 12 and oxide refractory melt 14 must be discontinued. While cooling media 12 and oxide refractory melt 14 are being added to solidification chamber 10, 11, it is preferred to rotate the solidification chamber 10, 11 (e.g., at a speed of about 3–10 rpm), to avoid the local build-up of high temperatures. After the solidification chamber 10, 11 is substantially filled with solidified oxide refractory melt 14 and cooling media 12, and the addition of cooling media 12 and oxide refractory melt 14 is discontinued. The base 11 is then removed from the substantially vertical hollow cylindrical outer wall 10. This is most conveniently accomplished by lifting outer wall 10, for example by means 20, so that the solidified oxide refractory melt and cooling media run down the substantially conical horizontal base 11 in all directions. If it is desired to prevent the cooling media 12 and solidified oxide refractory melt 24 from running down in all directions a retaining wall 21 can be provided around a portion of hollow cylindrical outer wall 10 in some portions of the apparatus. If such a retaining wall is utilized, it may be desirable to reshape the horizontal detachable base 11 so that the entire supply of cooling media and solidified oxide refractory melt leaves by the direction desired.

Figure 2:
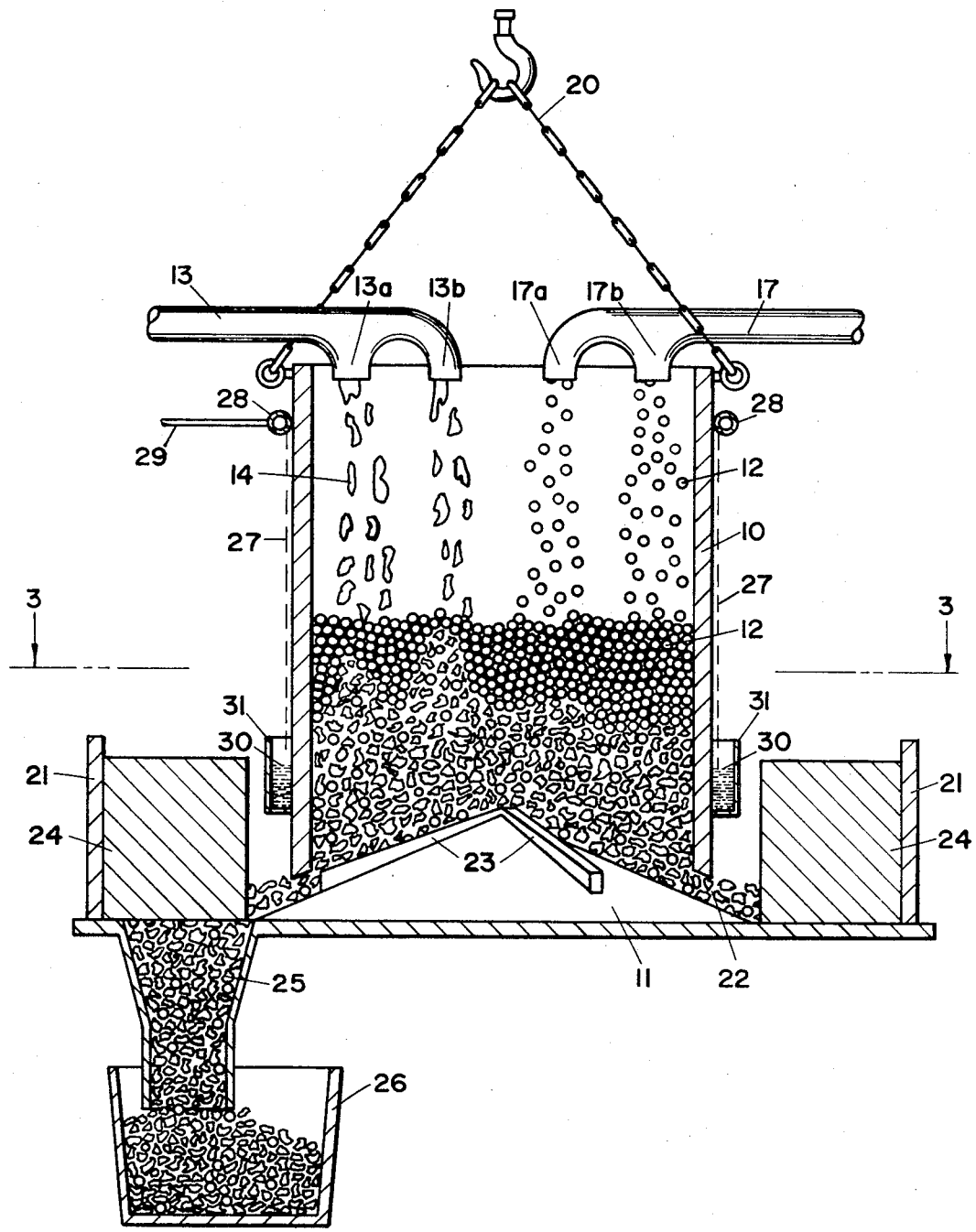
FIG. 2 is a side view, partially in section, of a similar apparatus comprising certain additional features which facilitate continuous operation.

Referring now to FIG. 2, there is illustrated an apparatus similar to that of FIG. 1, but comprising in addition certain features which facilitate continuous operation of the apparatus. Substantially vertical hollow cylindrical outer wall 10, substantially horizontal detachable base 11, cooling media 12, means 13 for casting oxide refractory melt 14 (including a plurality of inlets 13a and 13b into solidification chamber 10, 11) and means 17 for adding additional cooling media (including a plurality of inlets 17a and 17b into solidification chamber 10, 11) perform substantially the same functions in this second embodiment as they do in the embodiment illustrated in FIG. 1. Means 20 for lifting substantially vertical hollow cylindrical outer wall 10, however, performs the slightly different function of maintaining outer wall 10 in a permanently elevated position, such that the open lower end of outer wall 10 is partially blocked with substantially conical base 11. This makes possible the continuous recovery of cooling media 12 and solidified oxide refractory melt 14 from the solidification chamber 10, 11, through opening 22 between outer wall 10 and substantially conical base 11. In order to insure that opening 22 does not become clogged, it is preferable to provide substantially conical base 11 with ribs 23 for rearranging the cooling media and solidified oxide refractory melt upon the rotation of base 11. It is preferred to rotate base 11 comprising ribs 23 at a speed of from about 5 to about 20 rpm, while hollow cylinder outer wall 10 rotates at a different speed of from about 3 to about 10 rpm. The speeds of rotation of base 11 and outer wall 10 can be adjusted to provide a steady flow of coolinG media and solidified oxide refractory melt through opening 22, equaling the rate at which cooling media 12 and oxide refractory melt 14 are added to solidification chamber 10, 11. This continuous flow through opening 22 can then be retained by retaining wall 21, which in the case of the present embodiment encircles the entire apparatus and is located some distance from outer wall 10. This continuous flow of cooling media and solidified oxide refractory melt can then be collected, for example by means of rotating scrapers 24 provided on retaining wall 21, which push the solidified oxide refractory melt and cooling media through chute 25 into collecting bin 26.

When the apparatus is used in a continuous manner such as outlined above, it becomes important to provide means for cooling the substantially vertical cylindrical outer wall 10. This can be accomplished, for example, by means of falling cooling water 27 which is provided by perforated pipe 28 which is fed by water source 29. The falling cooling water 27 is then collected in pool 30 within water trough 31 and drained away by an appropriate outlet (not shown). If water cooling is used, it may be desirable to alter the shape of outer wall 10 slightly, such that the base of wall 10 is slightly larger than the top. This is to provide better contact of the falling water 27 with the outer wall 10. It is within the contemplation of the phrase "substantially vertical" to include such a variation from an absolute vertical nature of hollow cylindrical outer wall 10.

Figure 3:
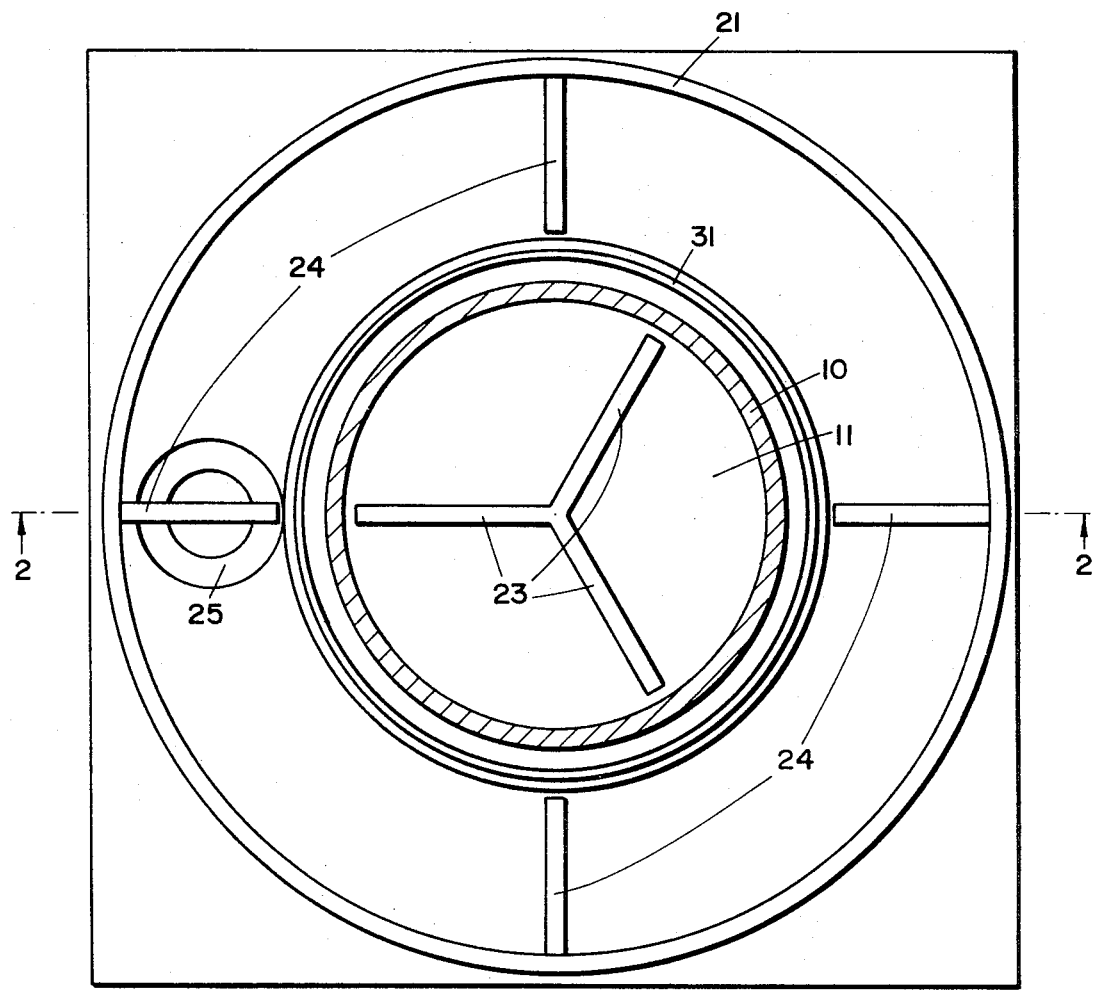
FIG. 3 is a cross section of FIG. 2, taken along line 3—3 of FIG. 2, FIG. 2 being taken along line 2—2 of FIG. 3.

FIG. 3 is a cross section of FIG. 2, taken along line 3—3 of FIG. 2, FIG. 2 being taken alone 2—2 of FIG. 3. In order to more clearly illustrate the parts of the apparatus shown, in FIG. 3 the apparatus is shown without any cooling media or oxide refractory melt.

FIG. 4 illustrates another embodiment of the present invention, wherein no base is required to cover the open lower end of the solidification chamber. This is because the continuous discharge of cooling media and solidified oxide refractory melt from the lower end of hollow cylinder 10 is controlled by the angle of inclination of the cylinder 10 which constitutes the solidification chamber. The apparatus illustrated in FIG. 4 is, like the apparatus illustrated in FIGS. 1-3, provided with a source 13 of oxide refractory melt 14 and a source 17 of additional cooling media 12. Hollow cylindrical outer wall 10 is preferably rotated, as shown by arrow 33, both to prevent local overheating of the cooling media and the hollow outer cylindrical wall 10, and also to assist in controlling the rate of discharge of cooling media and solidified oxide refractory melt into collecting bin 26. If the apparatus of FIG. 4 is utilized in a continuous manner, it is preferable to provide means, such as source 34 of cooling water, for cooling hollow cylindrical outer wall 10. The cooling water is collected in a suitable trough (not shown) and carried away. It is preferred to provide outer wall 10 with a flange 35 to prevent the cooling water from getting into the product, i.e. the cooling media and solidified oxide refractory melt.

In any of the above embodiments of this invention, the direct output of the solidification chamber is a mixture of cooling media and solidified oxide refractory melt. If the cooling media are steel spheres, the cooling media can easily be removed of the solidified oxide refractory melt by means of an electromagnet. The remaining solidified oxide refractory melt is found to have a extremely fine crystal structure, for example, at least 90 percent by numerical count of the discontinuous crystals in a two-phase system, having a particle size smaller than about 40 microns. Material having such a fine crystal structure is highly desirable, since it can be crushed to produce an extremely tough abrasive grain for inclusion in abrasive articles such as grinding wheels and the like.

I claim:
1. Apparatus for rapidly cooling and solidifying an oxide refractory melt, comprising;
   1. a solidification chamber having an upper end adapted for the addition of cooling media and oxide refractory melt to be rapidly cooled and solidified, and a lower end having therein an opening through which cooling media and solidified oxide refractory melt can be removed;
   2. an initial supply of non-reactive, non-melting particulate solid cooling media of a material other than that of the oxide refractory melt to be rapidly cooled and solidified, providing within the solidification chamber a depth of at least about 15 cm of cooling media;
   3. means for casting the oxide refractory melt into the solidification chamber over the cooling media; and
   4. means for adding additional cooling media while the oxide refractory melt is cast into the solidification chamber.

2. Apparatus according to claim 1, wherein the solidification chamber consists essentially of a hollow cylindrical outer wall having a lower open end, said hollow cylindrical outer wall being inclined at an angle whereby to control the continuous discharge of cooling media and solidified oxide refractory melt from the lower open end of the solidification chamber.

3. Apparatus according to claim 2, comprising in addition means for cooling the hollow cylindrical outer wall.

4. Apparatus according to claim 1, wherein the solidification chamber comprises a substantially vertical hollow cylindrical outer wall, and a substantially horizontal detachable base, capable of closing the opening in the lower end of the substantially vertical hollow cylindrical outer wall.

5. Apparatus according to claim 4, comprising in addition means for rotating the solidification chamber while the oxide refractory melt and additional cooling media are added to the solidification chamber.

6. Apparatus according to claim 4, wherein said detachable base has a substantially conical shape sloping downward from the center of the base.

7. Apparatus according to claim 6, comprising in addition means for rotating said detachable base relative to the vertical cylindrical outer wall, said detachable base being provided with ribs for rearranging the cooling media and solidified oxide refractory melt upon the rotation of the base relative to the vertical cylindrical outer wall.

8. Apparatus according to claim 6, comprising in addition means adjacent said conical base for collecting cooling media and solidified oxide refractory melt from the outer portion of the conical base.

9. Apparatus according to claim 8, comprising in addition means for cooling the substantially vertical cylindrical outer wall.

10. Apparatus according to claim 9, wherein the cooling media are carbon steel spheres ranging in diameter from about 5 to about 60 mm.

11. Apparatus according to claim 10, wherein the source of oxide refractory material and the source of additional cooling media are each provided with a plurality of inlets into the solidification chamber.

* * * * *